United States Patent
French

(10) Patent No.: US 12,159,054 B2
(45) Date of Patent: Dec. 3, 2024

(54) VERIFY FIRST WRITE TO EACH STORAGE AREA OF HARD DISK DRIVE

(71) Applicant: Western Digital Technologies, Inc., San Jose, CA (US)

(72) Inventor: Jim French, Grand Junction, CO (US)

(73) Assignee: Western Digital Technologies, Inc., San Jose, CA (US)

(*) Notice: Subject to any disclaimer, the term of this patent is extended or adjusted under 35 U.S.C. 154(b) by 89 days.

(21) Appl. No.: 17/836,861

(22) Filed: Jun. 9, 2022

(65) Prior Publication Data

US 2023/0401001 A1    Dec. 14, 2023

(51) Int. Cl.
*G11B 20/12* (2006.01)
*G06F 3/06* (2006.01)
*G11B 19/04* (2006.01)
*G11B 27/36* (2006.01)

(52) U.S. Cl.
CPC .......... *G06F 3/0653* (2013.01); *G06F 3/0604* (2013.01); *G06F 3/0619* (2013.01); *G06F 3/0655* (2013.01); *G06F 3/0676* (2013.01); *G11B 19/041* (2013.01); *G11B 19/048* (2013.01)

(58) Field of Classification Search
CPC ... G11B 20/1889; G11B 5/012; G11B 5/4969; G11B 19/045; G11B 20/1816; G11B 20/1819; G11B 2020/1896; G11B 2020/2516; G11B 27/36; G11B 20/18; G11B 20/12
USPC .............................................. 360/75, 48, 53
See application file for complete search history.

(56) References Cited

U.S. PATENT DOCUMENTS

| | | |
|---|---|---|
| 5,280,395 A | 1/1994 | Matsuzaki |
| 5,872,800 A | 2/1999 | Glover et al. |
| 5,941,998 A | 8/1999 | Tillson |
| 6,289,484 B1 | 9/2001 | Rothberg et al. |
| 7,609,596 B2 * | 10/2009 | Mori ................. G11B 7/00458 369/53.17 |

(Continued)

FOREIGN PATENT DOCUMENTS

WO    WO2004015707 A1    2/2004

OTHER PUBLICATIONS

International Business Machines Corporation, Understanding hard drive media defects white paper—Servers, Dec. 1997, 6 pages, downloaded at https://www.ibm.com/support/pages/understanding-hard-drive-media-defects-white-paper-servers.

*Primary Examiner* — Nabil Z Hindi
(74) *Attorney, Agent, or Firm* — John D. Henkhaus

(57) ABSTRACT

Identifying recording disk defects in a data storage device such as a hard disk drive (HDD), for which disk defects are not previously identified, includes responsive to a first user data write request to a particular storage area of a disk medium, writing the user data to the particular storage area, reading the written user data from the particular storage area, and verifying the integrity of the user data read from the particular storage area. Upon passing, a second user data write request to the same particular storage area can be fulfilled without again reading and verifying. Upon failing, the particular storage area is marked as defective and the user data is written to a different storage area. This procedure can be repeated in response to each initial user write request to each storage area of each disk medium, foregoing the need for disk surface scanning during manufacturing.

14 Claims, 2 Drawing Sheets

(56) References Cited

U.S. PATENT DOCUMENTS

| | | | |
|---|---|---|---|
| 7,702,973 B2 * | 4/2010 | Mead | G11B 20/1803 |
| | | | 714/719 |
| 7,813,242 B2 | 10/2010 | Hwang et al. | |
| 9,042,045 B1 | 5/2015 | Dang et al. | |
| 2008/0089196 A1 | 4/2008 | Hwang et al. | |
| 2008/0262643 A1 | 10/2008 | Creigh et al. | |

* cited by examiner

VERIFY FIRST WRITE TO EACH STORAGE AREA OF HARD DISK DRIVE

FIELD OF EMBODIMENTS

Embodiments of the invention may relate generally to data storage devices such as hard disk drives and particularly to approaches to reducing manufacturing costs.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

In HDD manufacturing, many tests are performed on each HDD. One such test is a disk surface scan to identify and record any defects of the magnetic-recording disks, at times referred to as a Surface Analysis Test (SAT). The motivation for the all-surface scans process is to enable data to be written to any place on the disk media with high confidence that, once written, the user will be able to read that data back at any time. Regions on the disk media where defects would cause imperfect retention of the written data are marked as unusable so that the user/host is never allowed to even attempt to write data to those defective areas of a disk. However, there is high cost to manufacturing due to the significant time required to perform complete scans of all disk surfaces.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to reducing hard disk drive manufacturing costs by foregoing defect-identifying disk surface scans are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that disk surface scans are typically performed during hard disk drive (HDD) manufacturing to identify magnetic-recording disk defects, and that this is a costly manufacturing process. Various techniques are employed to try to reduce the amount of time spent doing such defect-identifying disk surface scans during manufacturing, such as only verifying every other track. However, no technique is known to enable avoiding defect-identifying disk scanning altogether during HDD manufacturing.

Verify First Write Procedure

Figure 1:
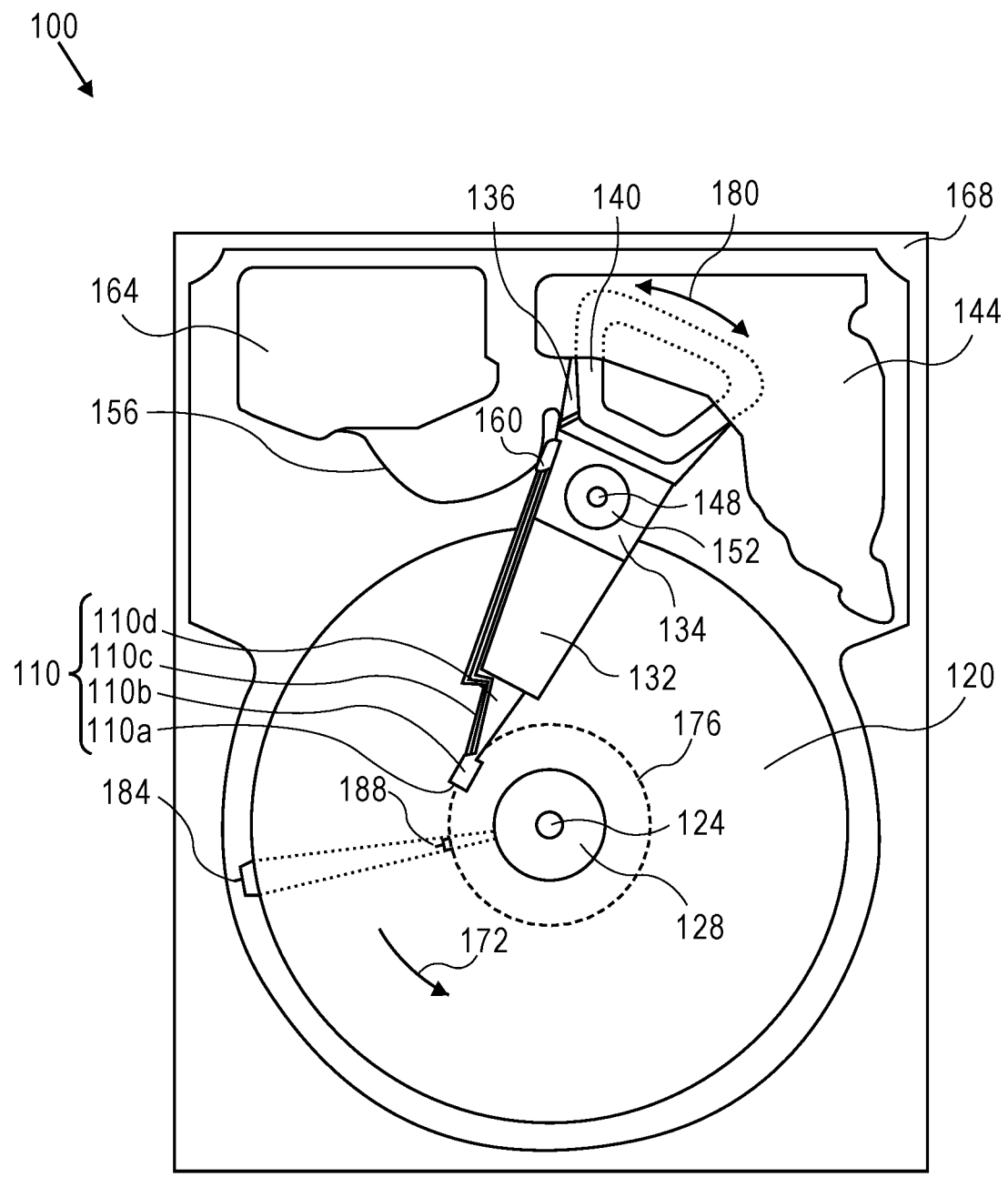
FIG. 1 is a plan view illustrating a hard disk drive (HDD), according to an embodiment.
Figure 2:
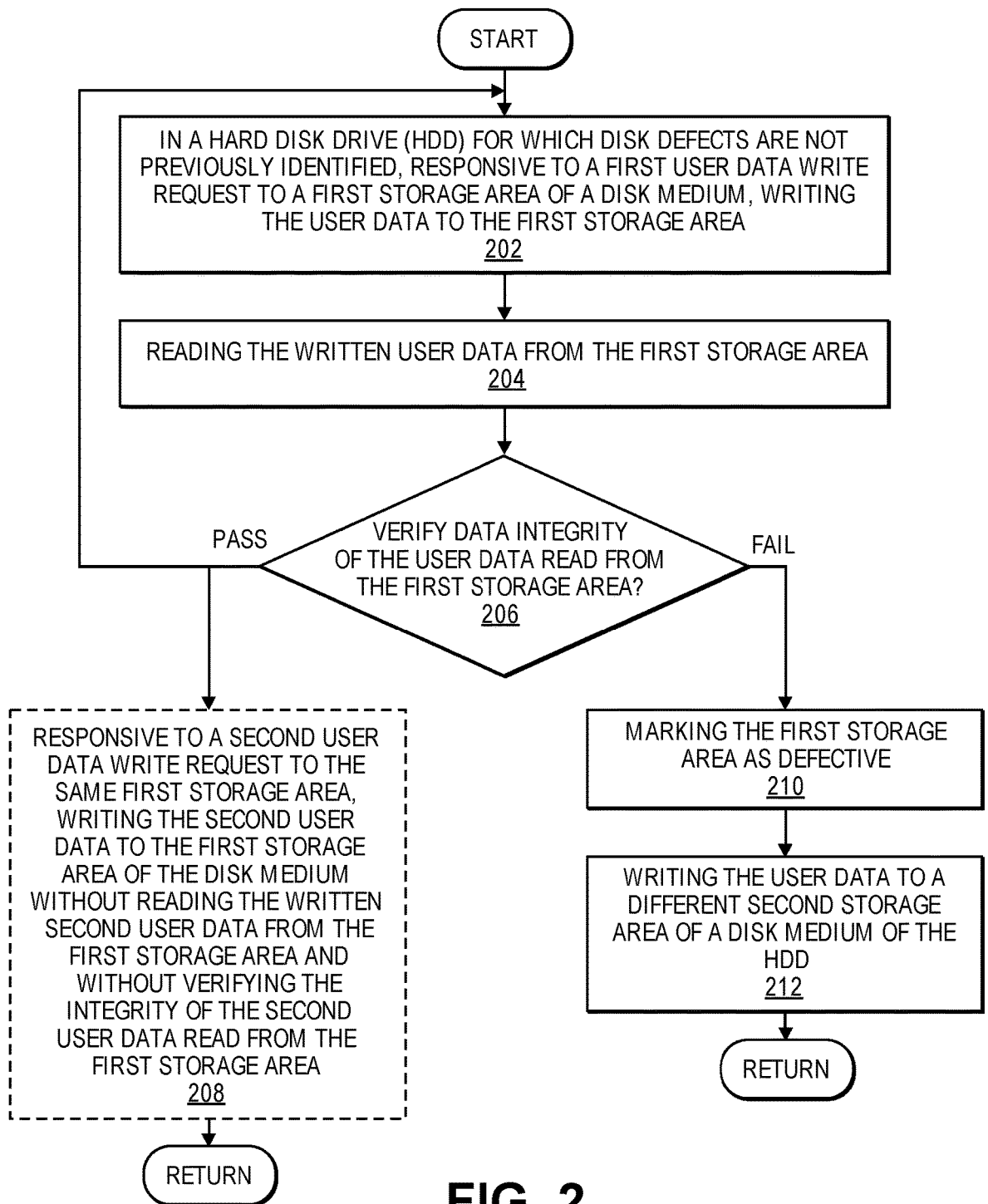
FIG. 2 is a flow diagram illustrating a method for identifying recording disk defects in a hard disk drive for which disk defects are not previously identified, according to an embodiment.

FIG. 2 is a flow diagram illustrating a method for identifying recording disk defects in a hard disk drive for which disk defects are not previously identified, according to an embodiment. The data storage process or procedure of FIG. 2 may be implemented for execution as one or more sequences of one or more instructions stored in one or more memory units and which, when executed by one or more processors, cause performance of the process. For example, the procedure of FIG. 2 may be implemented in machine-readable firmware stored in memory (e.g., ROM, or Read Only Memory) of a hard disk drive such as HDD 100 of FIG. 1.

In furtherance of avoiding all defect-identifying recording-disk surface scans during HDD manufacturing, according to an embodiment disk defects are handled (e.g., identified and stored) in the field by performing a read-verify operation(s) for every storage area of the disk media written to for the first time. Then, subsequent writes to already-verified areas do not need to be verified again and can be written to normally.

At block 202, in a hard disk drive (HDD) for which disk defects are not previously identified, responsive to a first user data write request to a first storage area of a disk medium, the user data is written to the first storage area. Here, the term "first storage area" is simply used to distinguish any particular storage area from a different "second storage area", and is not intended to imply any particular first location on the disk or the first ever write to the disk or otherwise. By contrast, the term "first user data write request" does refer to the first ever write request to that particular storage area. For example, responsive to receiving at the HDD the first user data write request or command to a particular storage area, such as from a host computing device, the user data is written to the particular storage area. In addition, a host computer device excludes any testing equipment that an HDD manufacturer may use to run tests on the HDD, including any media surface scanning test. Note that the size of each particular "storage area" which is verified in this procedure may vary from implementation to implementation. For example, a storage area may be composed of one or more sector, track, cylinder, and the like. Furthermore, the size of a particular storage area which is verified may vary within a given implementation or HDD and may be determinable on-the-fly based, for example, on the operational workflow of the HDD and/or host, e.g., based on the size of write operations the HDD typically receives from a given host.

At block 204, the written user data is read from the first storage area, and at decision block 206, the integrity of the user data read from the first storage area is verified. This series of operations may be referred to as a "read-verify" or "write-read-verify". According to embodiments, blocks 204 and 206 may be performed immediately upon writing the data (at block 202) or, alternatively, delay blocks 204 and 206 for some period of time after writing the data, such as while there is still a copy of the data in cache or other form of memory available for verification purposes. The manner in which the written data is verified at block 206, e.g., considered readable, may vary from implementation to implementation, and may employ known verification techniques such as a simple checksum or a more complex CRC (Cyclic Redundancy Code) algorithm check, read signal energy check, and the like, for non-limiting examples. Furthermore, the threshold at which the written data is considered bad (or good) during verification at block 206 may vary from implementation to implementation, and may be based on the types and the degree of various error recovery procedures and error-correction codes (e.g., hardware and/or firmware and/or software correction coding) that may be available, customer specifications, product warranties, and the like. If the written user data passes the verifying (at block 206) then the procedure can loop back to the top to await another write request to a different unverified storage area (i.e., a first user data write to a previously unwritten-to storage area), at which point it can again proceed through blocks 202-206 for this new unverified storage area.

It is noteworthy that this write-read-verify procedure of blocks 202-206 is performed to an HDD for which disk defects are not previously identified, and only in response to a first ever write to a particular storage area, so as to function as a disk defect-identifying operation for that particular storage area in lieu of a complete manufacturing disk scan. Furthermore, this procedure involves actual user data rather than test data typically used in manufacturing disk scans. Still further, the read-verify is performed in response to a "write" request or command, per se, rather than responsive to a user "read-verify" command, "write-verify" command, "write-read-verify" command or the like.

According to an embodiment, responsive to the written user data passing the verifying (at block 206), at block 208 in case of and responsive to a second user data write request to the same first storage area, the second user data is written to the first storage area of the disk medium without reading the written second user data from the first storage area and without verifying the integrity of the second user data read from the first storage area, e.g., without again performing blocks 204-206 on the same storage area which has already been verified as good. That is, once a particular storage area is verified as good (i.e., passes verification) via the procedure of blocks 202-206, then that particular storage area can operate or be operated upon unencumbered.

According to an embodiment, responsive to the written user data failing the verifying (at block 206), at block 210 the first storage area is marked as defective and at block 212 the user data is written to a different second storage area of a disk medium of the HDD, a procedure that may be referred to as bad sector management, sector replacement, and/or a reallocated sector. The manner in which a defect-identified storage area is "marked" may vary from implementation to implementation, and may employ known marking or flagging techniques such as adding an identifier of the storage area to a disk defect list (e.g., a "P-list") or table stored within the HDD, whereby this marked storage area is thereafter no longer used for storing data. According to an embodiment, responsive to the written user data failing the verifying (at block 206), one or more other storage areas positioned on the disk medium adjacent to or near the first storage area may also be marked as defective, a procedure that may be referred to as padding.

Based on the foregoing method of FIG. 2, all defect-identifying disk surface scans (e.g., SAT) during HDD manufacturing can be foregone, thereby minimizing or avoiding some HDD production costs based on manufacturing time and equipment (e.g., capital expenditure), for example.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for identifying recording disk defects in a substantially sealed hard disk drive (HDD) for which disk defects are not previously identified in an HDD manufacturing process, the method comprising:
    responsive to a first user data write request, from a host computing device, to a first storage area of a disk medium substantially sealed in the HDD, the first user data write request being an initial write request directed at the first storage area to which no other previous user data write request has been directed:
        writing the user data to the first storage area,
        reading the written user data from the first storage area, and
        verifying the integrity of the written user data read from the first storage area; and
    responsive to the written user data failing the verifying:
        marking the first storage area as defective, and
        writing the user data to a different second storage area of a disk medium; and
    responsive to the written user data passing the verifying,
        responsive to a second user data write request to the first storage area, writing the second user data to the first storage area of the disk medium without reading the written second user data from the first storage area and without verifying the integrity of the second user data read from the first storage area.

2. The method of claim 1, further comprising:
    responsive to the written user data failing the verifying, marking as defective one or more other storage areas positioned on the disk medium near the first storage area.

3. The method of claim 1, further comprising:
    repeating the writing, the reading, and the verifying in response to each first user data write request to each storage area of each disk medium of the HDD.

4. The method of claim 1, wherein the reading and verifying are performed immediately after the writing.

5. The method of claim 1, wherein the reading and verifying are delayed after the writing.

6. A non-transitory machine-readable medium storing one or more sequences of instructions which, when executed by one or more processors, cause performance of:
    in a substantially sealed hard disk drive (HDD) for which disk defects are not previously identified in an HDD manufacturing process, and responsive to a first user data write request, from a host computing device, to a particular storage area of a disk medium substantially sealed in the HDD, the first user data write request being an initial write request directed at the particular storage area to which no other previous user data write request has been directed:
        writing the user data to the particular storage area;
        reading the written user data from the particular storage area; and
        verifying the integrity of the user data read from the particular storage area; and
    responsive to the written user data failing the verifying:
        marking the particular storage area as defective, and
        writing the user data to a different storage area of a disk medium; and
    responsive to the written user data passing the verifying,
        responsive to a second user data write request to the particular storage area, writing the second user data to the particular storage area of the disk medium without reading the written second user data from the particular storage area and without verifying the integrity of the second user data read from the particular storage area.

7. The machine-readable medium of claim 6, wherein the one or more sequences of instructions, when executed by the one or more processors, cause further performance of:
    responsive to the written user data failing the verifying, marking as defective one or more other storage areas positioned on the disk medium near the particular storage area.

8. The machine-readable medium of claim 6, wherein the one or more sequences of instructions, when executed by the one or more processors, cause further performance of:
    repeating the writing, the reading, and the verifying in response to each first user data write request to each storage area of each disk medium of the HDD.

9. A hard disk drive comprising the machine-readable medium of claim 6.

10. A sealed data storage device (DSD) comprising:
    means for executing machine-executable instructions; and
    means for storing one or more sequences of machine-executable instructions which, when executed by the means for executing machine-executable instructions, cause performance of:
        responsive to a first user data write request, from a host computing device, to a particular storage area of a disk medium sealed in the DSD and for which disk defects are not previously identified in a DSD manufacturing process, the first user data write request being an initial write request directed at the particular storage area to which no other previous user data write request has been directed:
            writing the user data to the particular storage area,
            reading the written user data from the particular storage area, and verifying the integrity of the user data read from the particular storage area; and responsive to the written user data failing the verifying: marking the particular storage area as defective, and writing the user data to a different storage area of a disk medium; and responsive to the written user data passing the verifying, responsive to a second user data write request to the particular storage area, writing the second user data to the particular storage area of the disk medium without reading the written second user data from the particular storage area and without verifying the integrity of the second user data read from the particular storage area.

11. The data storage device of claim 10, wherein the one or more sequences of instructions, when executed by the means for executing machine-executable instructions, cause further performance of:

responsive to the written user data failing the verifying, marking as defective one or more other storage areas positioned on the disk medium adjacent to the particular storage area.

12. The data storage device of claim 10, wherein the one or more sequences of instructions, when executed by the means for executing machine-executable instructions, cause further performance of:

repeating the writing, the reading, and the verifying in response to each first user data write request to each storage area of each disk medium of the DSD.

13. A method for identifying recording disk defects in a hard disk drive (HDD) for which disk defects are not previously identified, the method comprising:

responsive to a first user data write request to a first storage area of a disk medium, the first user data write request being a first data write request directed at the first storage area:

writing the user data to the first storage area,
reading the written user data from the first storage area, and
verifying the integrity of the user data read from the first storage area; and responsive to the written user data passing the verifying:

responsive to a second user data write request to the first storage area, writing the second user data to the first storage area of the disk medium without reading the written second user data from the first storage area and without verifying the integrity of the second user data read from the first storage area.

14. A hard disk drive (HDD) comprising:

a plurality of disk media rotatably mounted on a spindle;
a head slider comprising a read-write head configured to write to and to read from a disk medium of the plurality of disk media;
a rotary actuator configured to move the head slider to access portions of the disk medium;
a substantially sealed enclosure in which the disk medium, the head slider, and the rotary actuator are housed; and
one or more sequences of instructions which, when executed by one or more processors, cause performance of:

responsive to a first user data write request to a first storage area of a disk medium, the first user data write request being a first data write request directed at the first storage area:

writing the user data to the first storage area,
reading the written user data from the first storage area, and
verifying the integrity of the user data read from the first storage area, and responsive to the written user data passing the verifying:

responsive to a second user data write request to the first storage area, writing the second user data to the first storage area of the disk medium without reading the written second user data from the first storage area and without verifying the integrity of the second user data read from the first storage area.

* * * * *